May 5, 1936  G. R. ECKSTEIN  2,040,042
DIRT INDICATOR FOR LUBRICATING OIL
Filed Feb. 18, 1933

Inventor
George R. Eckstein
Albert R. Henry
Attorney

Patented May 5, 1936

2,040,042

UNITED STATES PATENT OFFICE 2,040,042

DIRT INDICATOR FOR LUBRICATING OIL

George R. Eckstein, Buffalo, N. Y., assignor to Clardon Corporation, Buffalo, N. Y.

Application February 18, 1933, Serial No. 657,416

5 Claims. (Cl. 73—51)

This invention relates to dirt indicators, and it has particular reference to apparatus for indicating the presence of undue amounts of dirt in liquids, such, for example, as grit or water in the lubricating oil of an internal combustion engine.

The value of an oil as a lubricant depends, to a large extent, upon its cleanliness and freedom from particles of grit or dirt which may have an abrasive effect upon the bearings or other parts being lubricated. Such particles are frequently obscured by the color of the oil, or may be so fine, or present in such limited amounts, as to render their detection difficult by observation or rubbing drops of oil between the fingers. Accordingly, it is the object of the present invention to provide an apparatus which, while readily portable and of compact size, may be employed to detect the presence of foreign deleterious particles in the oil or other liquid being tested.

The present invention is predicated upon the utilization of sediment deposited by the liquid upon a screen, when such liquid is passed therethrough, as a means for operating an indicating device revealing the presence of such deposit, when the liquid contains more than a predetermined percentage of impurities. More particularly, the invention depends upon the clogging, to a greater or less extent, of a filter screen through which the liquid is made to pass, and the employment of such clogged screen as a barrier or wall for a chamber of variable volume. As the volume of the chamber is varied, while the screen is clogged, a pressure differential is created between the chamber and air or other fluid in the opposite side of the screen, and such pressure differential may be measured by a suitable indicator to reveal the presence of dirt in the liquid.

In the practical embodiments of the foregoing principles hereinafter described, the invention takes the form of a cylinder having a movable piston therein, which cylinder may be placed in communication with the liquid being tested through a filter formed of fine mesh wire. When liquid is drawn into the cylinder, by movement of the piston, the impurities are deposited on the screen and prevent or retard the further admission of liquid or air. There is accordingly created a partial vacuum in the cylinder, and such vacuum is measured by a gauge to indicate the clogging of the screen, and hence the presence of impurities in the liquid. Various additional features of the invention will become more apparent from a perusal of the following detailed description of such embodiments, illustrated in the accompanying drawing, wherein:

Figure 1:
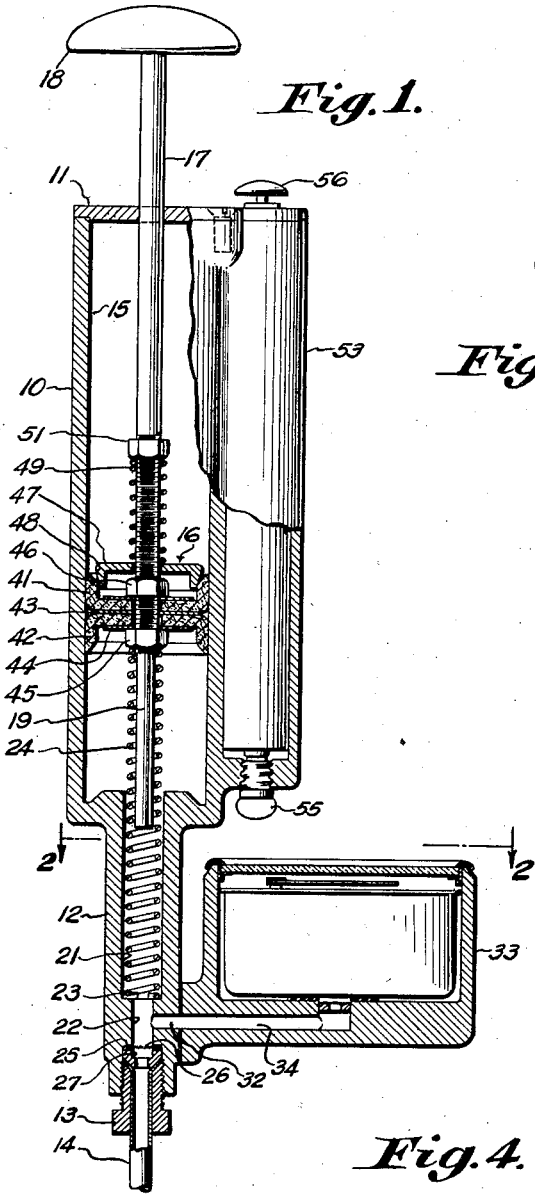
Fig. 1 is a longitudinal section through one form of apparatus.
Figure 2:
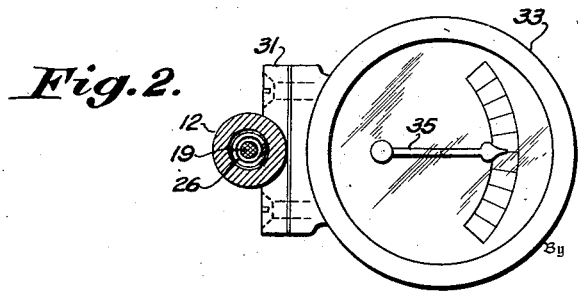
Fig. 2 is a section on the line 2—2 of Fig. 1.

The invention as shown in Figs. 1 and 2 comprises a cylinder 10 closed at its upper end by a cap plate 11 and merging at its lower end into a coaxial cylinder 12 of reduced diameter. A fitting 13 is secured to the lower end of the cylinder 12 to connect thereto a tube 14, which may be of flexible material, and which may be immersed in the liquid being tested. The bore 15 of the cylinder 10 snugly receives a piston, generally designated by the numeral 16, which is mounted on a piston rod 17, one end of which projects through an opening in the cap 11 to terminate in a hand grip or operating member 18. The piston rod 17 extends through the piston 16 to provide a stem 19 adapted to enter the bore 21 of the lower cylinder 12 as the piston is depressed in the cylinder 10.

The bore 21 of the cylinder 12 is reduced at its lower end to provide a bore 22 and a shoulder 23, upon which is seated a coil spring 24 encompassing the stem 19 of the piston rod, and engaging the lower face of the piston 16. It will thus be seen that, if the piston 16 is pushed downward into the bore of the cylinder 10, the volume of the chamber is diminished, and when the hand pressure is released, the spring 24 urges the piston upward, to expand or increase the volume of the chamber 15. Fluid will thereupon enter the cylinder 10 because of the atmospheric pressure exerted thereon. It will also be apparent that, if the flow of fluid through the tube 14 were shut off or retarded, a partial vacuum would be created in the chamber 15 as the volume thereof is increased by the movement of the piston 16 under the influence of the spring 24.

The lower end of the cylinder 12 is counterbored to form a shoulder 25 at the lower end of the bore 22, against which is placed a filter screen 26. A tapered washer 27 is positioned against the filter 26 to cooperate with the nut 13 to secure the tube 14 and to hold the filter in place. Fluid entering the chamber 15 is therefore first passed through the screen 26, and, as dirt deposits thereon, the filter becomes more or less clogged and acts as a valve preventing further admission of fluid. The intensity and continuity of the deposit on the screen 26 will therefore control the creation and maintenance of a partial vacuum in the chamber 15.

The filter screen 26 may be made of any suitable material with any desired degree of porosity, so that it will pass particles of less than a given size, or will not become appreciably clogged by less than a given amount of material. If the tube 14 is bent upwardly at its end in the form of a U, the amount of liquid which will be caught in the legs thereof may be regarded as a representative sample of the liquid being tested, and the quantity of dirt contained in such sample will accordingly represent the percentage of dirt in the entire liquid body. Hence, by proper proportion of the parts, the filter may be made to clog only when a predetermined percentage of dirt is contained in the liquid, or when the dirt particles reach a size which is deleterious to the lubricating properties of the oil. The screen may be made of fine wire having a mesh of say 200 or 250, and the bore of the tube 14 relatively small, so that a very slight amount of dirt will suffice to clog the screen 26. Or, the tube 14 may be enlarged and the screen 27 may be of coarser mesh, so that a greater quantity of dirt and larger particles must be present in the liquid before a sustained vacuum is developed to operate the indicator or gauge.

It may here be noted that the liquid may contain particles approaching molecular size, as, for example, in a colloidal suspension or solution of graphite in oil, which is not classifiable as a dirty oil, although it has a dark color. But, since such particles will pass the screen 26 readily, no indication of dirt will be had by virtue of such molecular particles, although a colorimetric test would indicate dirt. Again, the oil may contain water, and appear clean, but, as the screen is sensitive to surface tension effects in oil and water emulsions, a clogging action will result, and the presence of dirt will be indicated. These observations will serve to illustrate the applicability of the invention and some of the variations which may be restorted to to meet the conditions which may arise during use.

The lower portion of the cylinder 12 is formed with a laterally extending flange 31 formed with a bore 32 in communication with the bore 22. The flange 31 serves as a mounting pad for a gauge 33 provided with a bore 34 adapted to align with the bore 32 when the parts are assembled. The gauge 33 may take the form of a pressure differential gauge of the Bourdon type, in which variations in pressure on the fluid in the bore 34 and associated elements are reflected by the movement of an indicator needle 35. As this type of gauge is well known and has been extensively used in a variety of forms, no attempt will be made here to describe its complete mechanism or mode of operation, except to state that it may be made as sensitive as desired, so as to measure any degree of vacuum or diminution of pressure occurring in the bore 22, when the screen is clogged and the piston 16 is moved upward.

Thus, in practice, it may be assumed that the needle 35 is in a given position when the bore 34 is in communication with the atmosphere, or when the fluid in such bore is under atmospheric pressure. If the piston 16 is then moved to increase the volume of the chamber 15, and the screen 26 is not clogged by any impurities, atmospheric pressure will force fluid into the cylinder and the bore 34 of the gauge, without appreciable change in pressure, and the needle 35 will maintain, to all practical purposes, its normal position. If, however, the screen becomes completely clogged, a vacuum or reduced pressure will be created in the bore 34, and the needle will move to and remain in another position.

If the amount of deposit on the screen is comparatively small, the needle will initially indicate the presence of dirt, and will then gradually be restored to its normal position, as fluid seeps through the crevices in the screen 26 to relieve the pressure differential. The user of the device can therefore readily determine whether the oil or other liquid is clean, dirty beyond a predetermined degree, or slightly dirty, depending upon the effect produced on the needle 35. While reference has been made to the well known Bourdon gauge in this connection, it will, of course, be understood that other pressure responsive devices may be used for the same purpose.

After the apparatus has once been used, and the condition of the liquid determined, any quantity of oil drawn into the cylinders may be expelled by simply forcing the piston 16 downward, and the spring 19 thereafter will restore the piston to its upper position. Dirt deposited on the screen 26 is washed off when the liquid is discharged, and hence the apparatus is self cleaning and does not vary in its operating characteristics during use.

The piston 16 in the chamber 15 is of special construction to insure a tight fit and to prevent leakage of air or liquid which might affect adversely the sensitivity of the apparatus. The mid portion of the piston rod 17 is threaded to a point merging with the lower section 19 thereof, which, as will be noted from Fig. 1, is of slightly reduced diameter. The piston is formed of a pair of cup shaped rings 41 and 42 placed back to back against a washer 43. Similar washers 44 are placed within each cup washer, and the superimposed assembly is compressed and is secured to the piston rod 17 by a pair of nuts 45 and 46. Mounted above the upper cup 41 is a circular disk 47 having a depending tapered annular flange 48, which is constantly forced into the cup 41, to spread the flange thereof, by a coil spring 49 surrounding the rod 17, and restrained from upward movement by a stop nut 51 mounted on the piston rod. With this construction, a tight contact is assured at all times between the flexible material of the cup packings and the walls of the chamber 15.

The cylinder 10 is also formed with a contiguous cylindrical portion 53, which is bored out to receive a flash light battery 54 operating a small light bulb 55 mounted in the lower end of the cylinder, over the face of the gauge 33. An operating switch 56 is formed in the cap member 11, and hence readings may be taken with the apparatus at night or under other conditions when the illumination is low. The detailed construction of these parts may follow that generally known, and hence no attempt will be made here to present a more specific description of such details.

In operation, the user need only place the tube 14 in the liquid to be tested, depress the piston 16, and then observe the behavior of the needle 35 as the piston is restored under the influence of the spring 24, in order to determine the presence of dirt in the liquid.

Figure 3:
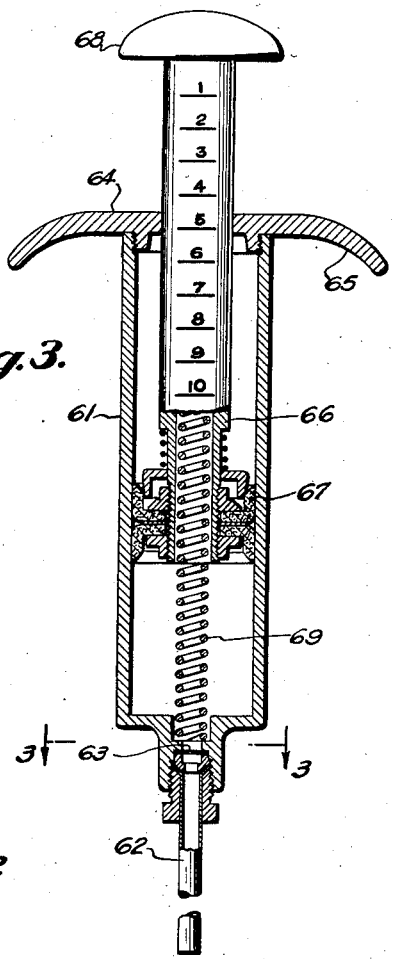
Fig. 3 is a longitudinal section of another embodiment of the invention.
Figure 4:
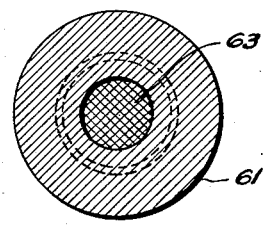
Fig. 4 is an enlarged section on the line 4—4 of Fig. 3, illustrating particularly the filter screen.

In the embodiment of the invention illustrated in Figs. 3 and 4, there is shown a cylinder 61 having a tube 62 secured to the lower end thereof, and a screen 63 interposed between the chamber of the cylinder 61 and the bore of the tube. The opposite end of the cylinder 61 is closed by a cover plate 64, formed with laterally extending finger pieces 65. A piston rod 66, on which is mounted a piston 67, projects upward through the cover 64 and terminates in a knob 68. It will be apparent that the foregoing parts serve the general functions and purposes of the corresponding parts in the previously described embodiment of the invention, but that, by virtue of the finger pieces 65, the piston rod 66 may be depressed while the instrument is held in one hand, in a manner similar to the operation of a hypodermic syringe.

The piston rod 66 is of somewhat larger diameter than the piston rod 17 of the first described embodiment, and it is formed with a recess adapted to receive one end of the spring 69, seated at the bottom of the cylinder 61, which normally forces the piston rod 66 in an upward direction. The surface of the piston rod 66 is marked with a series of graduation lines, 1, 2, 3, etc., which become progressively visible as the spring 69 forces the piston upward.

When clean liquid is induced into the chamber of the cylinder 61, the piston rod 66 will move upward until the mark 10 is visible, there being no dirt on the screen 63 to retard or prevent such movement. If, on the other hand, the liquid is dirty, the dirt will deposit on the filter 63 and eventually clog it entirely. Such clogging of the screen will arrest the movement of the piston rod 66, and the last visible mark prior to such arrest will indicate the degree of dirtiness of the liquid. Thus, if the mark 9 were visible, the liquid would be much cleaner than if only the mark 1 or 2 were visible. The graduations on the piston rod 66 may, of course, be either arbitrary or may be calibrated to represent definite quantities or percentages of dirt, as may be desired.

From the foregoing description, it will be apparent that the invention provides simple but effective means for indicating the presence and extent of dirt or film forming impurities in liquids, in which the passage of liquid containing a predetermined amount of dirt through a filter screen causes such filter to close automatically, after the fashion of a valve, thereby producing a measurable pressure effect in a closed chamber. If the size of the bore of the tube 14 or 62 is fixed, and the mesh of the screen 26 or 63 is predetermined, then these values become constant for the apparatus, and the degree of closing of the screen will depend upon the amount of material deposited thereon. Obviously, the numerical values may be varied as desired to make the apparatus readily applicable to a variety of uses. It will be understood that various changes and modifications may be made in the form and construction of the apparatus, and it is intended that all such variants shall be regarded as a part of the invention, as set forth in the following claims.

I claim:

1. In a portable hand tool constituting a dirt indicator for liquids, a cylinder, a piston in the cylinder, a piston rod extending from the piston through one end of the cylinder, a hand grip at the end of the piston rod, whereby said cylinder may be held in one hand while said piston is operated by the other, a spring positioned between said piston and the opposite end of the cylinder, a conduit communicating with the cylinder adjacent said spring, a filter in the conduit, and a pressure gauge in fluid communication with the cylinder and conduit on one side of the filter to indicate variations in pressure on opposite sides of the filter as said filter becomes clogged.

2. In a portable hand tool constituting a dirt indicator for liquids, a cylinder, a piston in said cylinder, a liquid conduit connected to one end of the cylinder, a piston rod connected to said piston and extending beyond the cylinder, said piston rod being of such size that said piston may be moved manually through said cylinder in one direction while said cylinder is manually held, a spring disposed in said cylinder and engaging said piston for moving the piston in the opposite direction, means in said conduit for obstructing the passage of dirt particles contained in liquid flowing through said conduit, and a pressure gauge in fluid communication with the cylinder and said conduit on one side of said dirt obstructing means to indicate variations in pressure on opposite sides of said means as the said means becomes clogged with dirt.

3. In a portable hand tool constituting a dirt indicator for liquids, a cylinder, a piston in said cylinder, a piston rod connected to said piston and projecting beyond one end of the cylinder, a hand grip on the end of the piston rod, whereby the piston may be operated manually in the cylinder while said cylinder and tool are manually held, a spring interposed in the cylinder between one end thereof and said piston to urge the piston against the direction of manual movement, said cylinder being formed at the end opposite said hand grip with a passage of restricted size, a sampling tube connected to the cylinder and in fluid communication with the passage, a filter disposed in said passage, said filter being pervious to liquids and impervious to dirt, whereby, upon admission of liquid to said cylinder through said tube, said filter will become clogged by dirt therein and the resistance to the movement of said piston increased, and means on said tool visible while manually held to indicate the extent of said clogging.

4. In a portable hand tool constituting a dirt indicator for liquids, a cylinder, formed with a cap portion at one end and a reduced portion at the opposite end, a piston in the cylinder, a piston rod connected to said piston and projecting through said cap portion, said projecting portion terminating in a hand grip, whereby said tool may be operated manually, a spring disposed in said cylinder between said piston and said reduced portion, a passage formed in said reduced portion, a filter disposed in said passage, and a sampling tube connected to said cylinder and in fluid communication with said passage, whereby said cylinder may be cleared of its contents by manual downward movement of the piston and liquid freed from dirt may be admitted into the cylinder through said tube and filter upon the upward movement of the piston under the influence of said spring, and means on said tool visible while manually held to indicate the extent of clogging of the filter.

5. In a portable hand tool constituting a dirt indicator for liquids, a cylinder, a piston in said cylinder, a piston rod connected to said piston and projecting through one end of the cylinder, a hand grip on the projecting end of the rod whereby said tool may be operated while manually held, said piston rod being formed on its inner end with a recess, a spring disposed in said recess and against the opposite end of the cylinder, said opposite end being formed with a restricted liquid passage, a filter disposed in said passage, and a sampling tube connected to said opposite end of the cylinder and in fluid communication with said passage, whereby the cylinder may be cleared of its contents by manual downward movement of the piston and liquid may be drawn thereinto by upward influence of the spring on the piston until said filter is clogged by dirt contained in the liquid, and means on said piston rod to indicate the extent of clogging of said filter.

GEORGE R. ECKSTEIN.